May 22, 1934.  H. N. HUSE  1,959,760
BALL WINDING MACHINE
Filed July 12, 1932   3 Sheets-Sheet 3
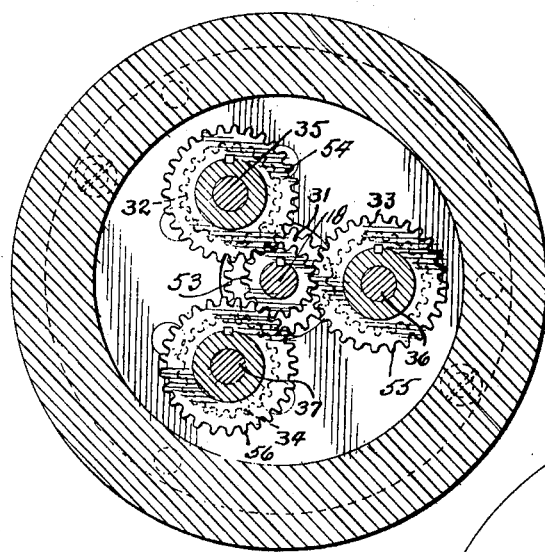
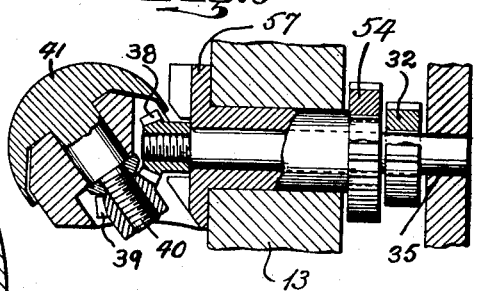
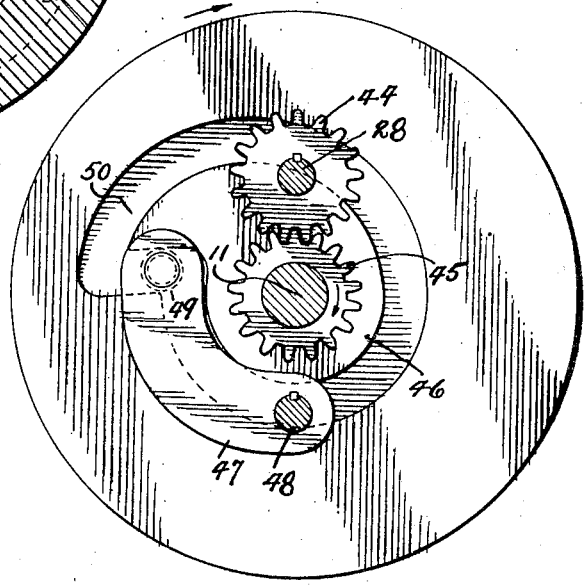
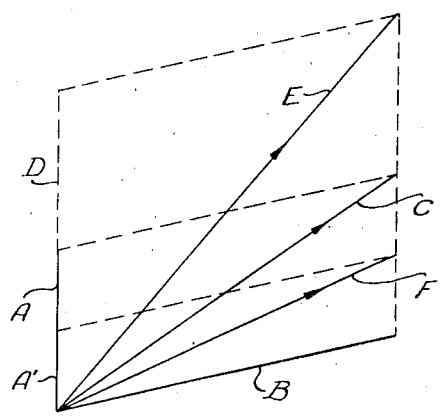
INVENTOR.
Hiram N. Huse
BY
ATTORNEYS.

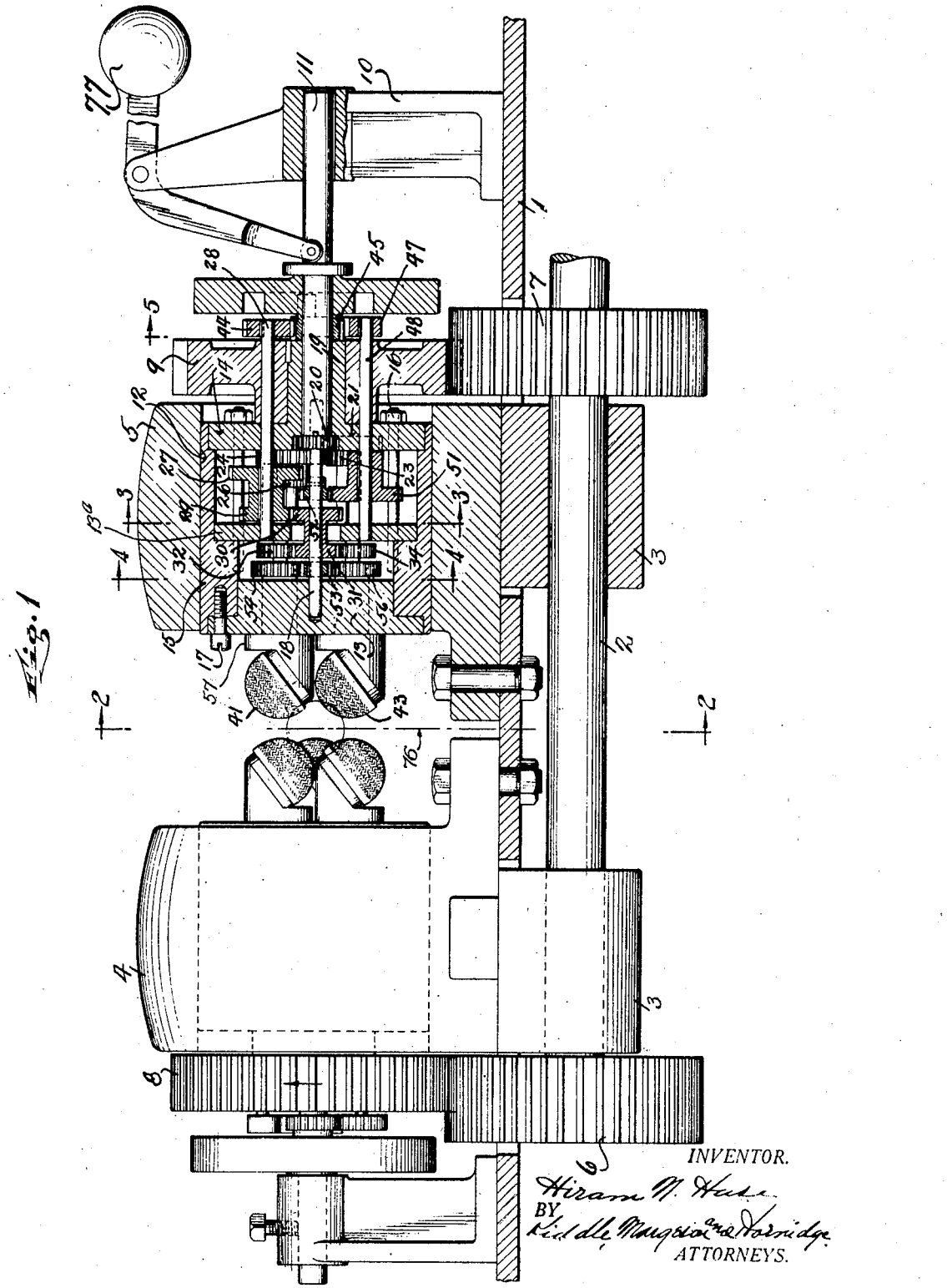

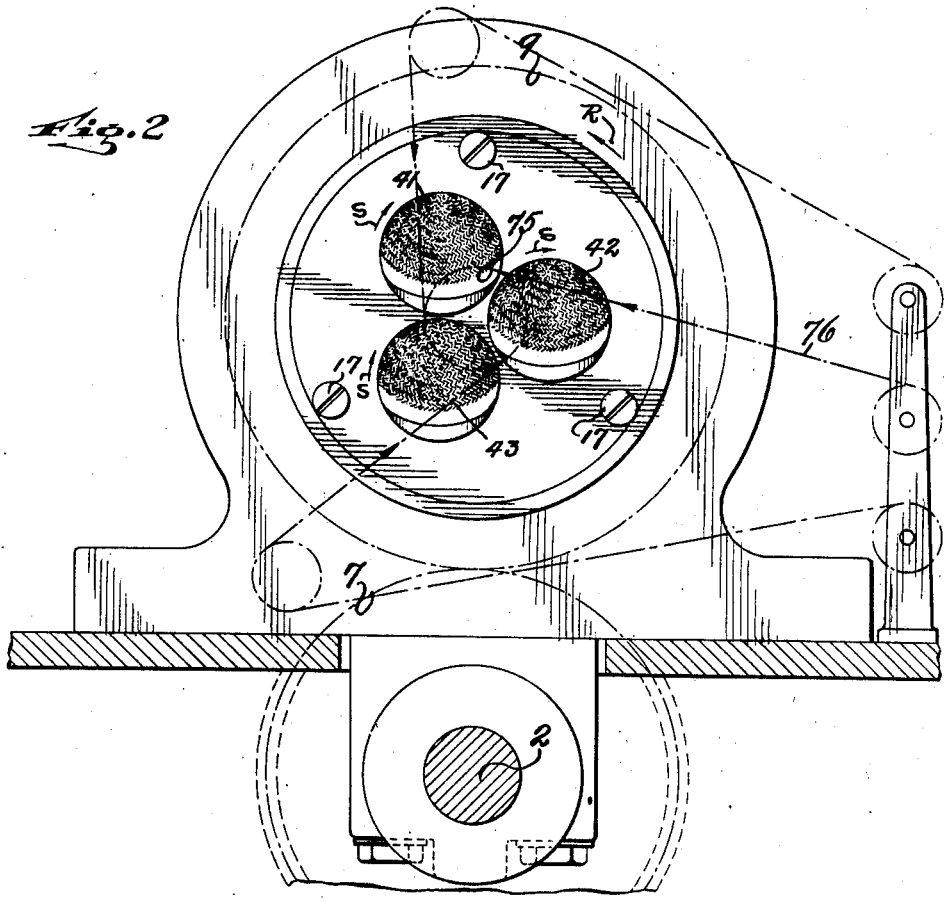

Patented May 22, 1934

1,959,760

UNITED STATES PATENT OFFICE 1,959,760

BALL WINDING MACHINE

Hiram N. Huse, Providence, R. I.

Application July 12, 1932, Serial No. 622,046

17 Claims. (Cl. 242—3)

This invention is directed to a machine for winding golf balls and provides a construction wherein the ball as it is being wound is held between two driven rotatable heads each of which carries three spherical rollers, the rollers being driven about individual axes whereby in the winding operation a spherical ball is produced.

In the accompanying drawings:

Fig. 1 is a part sectional elevational view of an embodiment of my invention;

Fig. 2 is a section on the line 2—2 of Fig. 1;

Fig. 3 is a section on the line 3—3 of Fig. 1;

Fig. 4 is a section on the line 4—4 of Fig. 1;

Fig. 5 is a section on the line 5—5 of Fig. 1;

Fig. 6 is a sectional elevational view of some of the details of the mounting and drive for one of the spherical rollers; and Fig. 7 is an explanatory diagram.

Referring to the drawings in detail, my improved machine comprises a base or bed 1 adapted to carry the entire mechanism. 2 is the main drive shaft mounted in bearings 3 carried on the underside of rotor housings 4 and 5 which are mounted on the bed 1 and bolted thereto.

The drive shaft 2 may be driven from any suitable source of power and is provided with like gears 6 and 7, gear 6 meshing with a gear 8 for the rotor which is within the rotor housing 4 while the gear 7 drives a gear 9 for the rotor within the rotor housing 5.

Inasmuch as the two rotors employed in this machine are alike in construction I shall confine myself to a description of one only.

The rotor within the housing 5 is shown in Figs. 1, 3 and 4 to which reference will now be made.

Bedplate 1 carries a support 10 for mounting one end of a shaft 11, keyed therein which extends into and terminates within the head 14 of the rotor 12, this rotor comprising two heads 13 and 14 rigidly secured to an intermediate member 15 by bolts 16 and screws 17. The shaft 11 is provided with a rotatable extension 18 extending into the rotor head 13 as shown in Fig. 1.

The head 14 of the rotor is provided with a hub 19 in which the shaft 11 has a bearing and this hub carries the gear 9 previously referred to and which is keyed or otherwise rigidly affixed thereto.

Fast on the shaft 11 is a gear 20 meshing with a gear 21 loose on a rod 22 mounted in the head 13 and member 13a of the rotor (Figs. 1 and 3).

The shaft or rod 22 carries a small loose gear 23 meshing with a gear 24 loose on a shaft 25 also mounted in the two heads of the rotor, this shaft 25 carrying a loose pinion or small gear 26 meshing with gear 27 keyed to shaft 28, this same shaft mounting a small gear 29 which is keyed to the shaft and which may be integral with the gear 27. This gear 29 meshes with a gear 30 loose on the extension 18 of shaft 11 above referred to.

Integral with the gear 30 is a gear 31 meshing with spindle gears 32, 33 and 34 keyed to shafts 35, 36 and 37, respectively (Figs. 4 and 6).

Each spindle shaft 35, 36 and 37 projects through the inner end of the rotor head 13 and is provided with a bevel gear 38 (Fig. 6), each of these gears in turn meshing with a gear 39 on the shank 40 of the spherical rollers 41, 42 and 43 (Fig. 2).

The shaft 28 to which the gears 27 and 29 are keyed, as above mentioned, carries at its rear end a gear 44 meshing with a gear 45 affixed to a cam 46 which is rotatably mounted on the rotor shaft 11 as shown in Figs. 1 and 5.

47 designates a cam lever mounted on cam lever shaft 48 and keyed thereto, this lever carrying cam roller 49 which follows the cam track 50 in cam 46. The motion given to the cam lever 47 by the shape of the path 50 in the cam 46 is transmitted to gear 51 carried on the shaft 48 and by it to gear 52 keyed on the shaft 18.

The shaft 18 has keyed to it a gear 53 meshing with gears 54, 55 and 56 which gears are secured to a mount 57 for each of the spherical rollers 41.

It will be appreciated from all the foregoing therefore that the rotors of the machine revolve in the same direction about the longitudinal axis of the machine through the gears 6, 7, 8 and 9 (Figs. 1 and 2).

It will be appreciated also that I have provided means whereby the spherical rollers 41, 42, 43 are rotated about their individual axes, such rotation of these rollers being due to the following construction: The gear 20, as above mentioned, is fixed to the non-revolving shaft 11. This gear 20 meshing with gear 21 drives the pinion 23 which in turn drives the gear 24 to impart motion to pinion 26. This drives the gear 27 which is keyed to the shaft 28. The gear 27 is integral with gear 29 on shaft 28 and as gear 29 meshes with gear 30 on the shaft 18 and integral with gear 31 motion will be imparted to spindle gears 32, 33 and 34 and to shafts 35, 36 and 37. As each of these shafts, as above mentioned, is provided with the bevel gear 38, meshing with the gear 39 on the spindle of each spherical roller, each of the spherical rollers will be rotated always in the same direction about the axis of the spindle carrying each roller, for instance, in Fig. 6 about the axis of the spindle 40.

I also provide for individual rotation of the mount 57 for each of the spherical rollers. The shaft 28, as just noted above, is rotated on its own axis, and is also revolved about the axis of the machine. Consequently the gear 44 carried on the outer end of this shaft will be rotated about the axis of the shaft to impart rotation to the cam 46. This motion of the cam 46 will impart through the cam roller 49 and cam lever 47 a rocking motion to the cam lever shaft 48 in accordance with the shape of the cam track 50, this rocking motion being imparted to the mounts for the several spherical rollers through gears 51, 52, shaft 18 and gear 53 which is in mesh with the gears 54, 55 and 56.

Now assuming that thread 76 under tension is led to the core 75 from a fixed source directly in line with the vertical plane through the center of the core of the ball, as shown in Figs. 1 and 2, and that the two rotors of the machine are rotating in the direction of the arrow R on Figure 2, it will be apparent that if the spherical driving rollers 41, 42 and 43 simply were carried around with the rotors, the ball core would merely be rotated about the horizontal axis of the machine and the thread wound around the core on the equatorial plane. It would be evident also that if the axes of the driving rollers 41, 42 and 43 were parallel to the axes of rotation of the rotors the core would be given the same motion. However, the axes of the driving rollers 41, 42 and 43 are at angles to the axis of rotation of the rotors of the two heads of the machine, so that if the rotors were stationary and the driving rollers rotated in the direction of the arrows S on Fig. 2 the core would be turned or rotated about an axis at the same angle to the longitudinal axis of the machine as the setting of the spindles 40 of the driving rollers.

However, rotation of the rotors of the machine and rotation of the driving rollers 41, 42 and 43 about their individual axes take place simultaneously so that the core is given such movement that the thread is applied about or along various great circles of the core.

It should be noted that throughout all movements imparted to the core the driving rollers 41, 42 and 43 never leave the core and are always driving in the direction of rotation of the core and constitute a rolling motion relative to the surface of the ball, so that all rubbing or abrasive action is eliminated and injury to the thread 76 thereby avoided.

In addition to the movements of the driving rollers above described, the mounts 57, Fig. 6, for the several spherical rollers are given a rotary motion in parallel relation about axes parallel to the axis of rotation of the rotor units or heads of the machine, through the cam 46, first in one direction and then the opposite direction, to shift the axes of rotation of the rollers with respect to the rotor units or heads of the machine, this movement depending of course on the shape of the cam track 50, and such movement will obviously vary the angle of movement otherwise imparted to the ball by the rotation of the heads and individual rotation of the driving spherical rollers 41, 42 and 43.

Consequently as the thread 76 is constantly being drawn onto the core due to the winding rotation of the head units, a true sphere is produced by intermittently changing the driving axis of the core relative to the winding axis. It will be appreciated that such intermittent change of the driving axis is governed by the action of the spherical roller mounts controlled by the action of the cam acting simultaneously with the movement of the spherical rollers on their own axis.

The movement of the ball during the winding operation may be better understood from reference to the diagram of Fig. 7.

Assuming that the rotors of the machine are rotating away from the source of thread supply: If the rotors were simply rotated about a horizontal axis and the spherical rollers and the mounts therefor simply travel with the rotors then the line A represents the distance and direction traveled by a point on the surface of the ball in a given length of time about a horizontal axis.

The line B represents distance and direction of travel of the point on the surface of the ball in the same length of time about an inclined axis, assuming now that the hemispheres or rollers 41, 42 and 43 are being driven about their own axes only. We may assume for illustration that this distance is twice as far as the distance A. We then have a resultant C which represents actual distance and direction of travel of the point in the assumed length of time.

However, the mounts for the hemispherical rollers 41, 42, and 43 are also rotated about their own axes, first we will assume in the opposite direction to the movement of the rotors. This increases length of line A. Let us assume that it doubles it as represented by line A+D. B remains unaffected and we then have the assumed point on the ball surface traveling in direction E for a distance represented by the length of E and there is a general change in direction of the movement of the assumed point on the ball from C toward A+D. If the mounts then are allowed to remain stationary obviously the line instantly drops back to C again. If mounts are reversed then A+D is shortened to distance A', for instance, and direction drops to F.

To compensate for the gradually increasing diameter of the ball, the head 12 and associated mechanism is allowed to slide away from the other head, this movement being controlled by weight 77.

It will be seen from the foregoing that I have provided a machine for winding balls in which a true sphere will be produced, it being understood of course that one or a plurality of threads may be wound on at the same time. It will be appreciated also that inasmuch as the hemispherical rollers 41, 42 and 43 are always being rotated in driving contact with the ball there can be no chafing or scrubbing of the thread on the surface of the ball, which has always been a source of trouble heretofore.

It is to be understood that changes may be made in the details of the construction above described within the purview of my invention.

What I claim is:

1. In a ball winding machine, the combination of opposed rotary winding heads, and rotary ball gripping means carried by said heads having spherical driving surfaces cooperating with said heads to present different parts of the ball surface to the point of winding, said driving surfaces being maintained at all times in driving contact with the ball surface.

2. In a ball winding machine, the combination of opposed rotary winding heads, and hemispherical rotary ball gripping rollers carried by said heads and maintained at all times in driving rolling contact with the ball surface, said rollers cooperating with the winding heads to present a continuously changing part of the ball surface to the point of winding.

3. In a ball winding machine, the combination of opposed rotary winding heads, hemispherical rotary ball gripping rollers carried by said heads, rotary mounts for said gripping rollers, the axis of rotation of the said rollers being at an angle to the axis of rotation of said heads, and the axis of rotation of said mounts being parallel to the axis of rotation of said heads, said rollers being maintained at all times in rolling driving contact with the surface of a ball being wound.

4. In a ball winding machine, the combination of opposed rotary winding heads, ball gripping rollers carried by said heads, means for rotating said rollers on their individual axes with the rollers in constant rolling driving contact with the surface of a ball being wound, mounts for said rollers, and means for rotating said mounts on axes parallel to the axis of rotation of said heads.

5. In a ball winding machine, the combination of opposed rotary winding heads, ball gripping rollers carried by said heads, means for rotating said rollers on axes which are at an angle to the axis of rotation of the winding heads, supports for said rollers rotatable about axes parallel to the axis of rotation of the winding heads, and a cam for controlling the rotation of said roller supports.

6. In a ball winding machine, the combination of opposed rotary winding heads, rotatable ball-gripping means carried by each of said heads, said ball-gripping means having spherical driving surfaces and cooperating with said heads to present different parts of the ball surface to the point of winding, said driving surfaces being maintained at all times in driving contact with the ball surface, and means for rotating each of said ball-gripping means at the same peripheral speed.

7. In a ball winding machine, the combination of opposed rotary winding heads, ball-gripping rollers carried by said heads, means for rotating said rollers on their individual axes with the rollers in constant rolling driving contact with the surface of a ball being wound, mounts for said rollers, means for rotating said mounts on axes parallel to the axis of rotation of said heads, and means for reversing the direction of rotation of said mounts.

8. In a ball winding machine, the combination of opposed winding heads, means for rotating said heads, sets of ball-gripping members carried by each of said heads, said members being offset with respect to the axis of rotation of said heads and revolving with said heads, the ball-gripping members carried by one head being in fixed alignment with the ball-gripping members carried by the other head, means for maintaining said ball-gripping members in rolling driving contact with the surface of a ball being wound, means for rotating said ball-gripping members, mounts for each of said ball-gripping members, and means for rotating said mounts about axes parallel to the axis of rotation of said heads, and means for reversing the direction of rotation of said mounts during the rotation of the heads.

9. In a ball winding machine, the combination of opposed winding heads, means for rotating said heads, sets of ball-gripping members carried by each of said heads, a spindle for mounting each of said ball-gripping members, said spindles being set at an acute angle to the axis of rotation of said heads, means for rotating said ball-gripping members simultaneously, means for maintaining said ball-gripping members in driving rolling contact with a ball being wound, rotatable mounts for each of said spindles and ball-gripping members, and means for effecting simultaneously rotation of said mounts to vary the setting of the ball-gripping members with respect to the winding heads.

10. In a ball winding machine, the combination of opposed rotatable winding heads, means for rotating said heads, a plurality of ball-gripping rollers mounted on each head and revolving therewith, said rollers having spherical driving surfaces maintained in rolling driving contact with the surface of a ball being wound, means for rotating said rollers simultaneously, means for varying the relation of the axes of rotation of said rollers with respect to said heads, said rollers cooperating with the winding heads to provide and maintain a plurality of locating and driving rolling contacts with the surface of the ball being wound.

11. In a ball winding machine, the combination of opposed rotary winding heads, ball gripping rollers carried by each of said heads, means for rotating said rollers on their individual axes during rotation of the winding heads, and means for varying the axes of rotation of said rollers relatively to said heads.

12. In a ball winding machine, the combination of opposed rotary winding heads, rotary ball gripping rollers carried by each of said heads, means for changing the relation of the axes of rotation of the rollers with respect to said heads, said rollers at all times rolling in driving contact with the surface of the ball and cooperating with said heads to present different parts of the ball surface to the point of winding.

13. In a ball winding machine, the combination of opposed rotary winding heads, rotary ball gripping rollers carried by each of said heads, means for changing the relation of the axes of rotation of the rollers with respect to said heads, said rollers at all times rolling in driving contact with the surface of the ball and cooperating with said heads constantly to present different parts of the ball surface to the point of winding.

14. In a ball winding machine, the combination of opposed rotary winding heads, ball gripping rotary rollers carried by each of said heads, means for holding said gripping rollers at all times in driving contact with the ball surface, means for rotating said rollers on their individual axes during rotation of the winding heads, continuously to present different parts of the ball surface to the point of winding, and means for changing the relation of the axes of rotation of said rollers with respect to said heads.

15. In a ball winding machine, the combination of opposed rotary winding heads, hemispherical ball gripping rollers carried by each of said heads, the axes of rotation of said rollers being at an angle to the axis of rotation of said heads, means for changing the relation of the axes of rotation of the said rollers with respect to the axes of rotation of said heads, said rollers at all times rolling in driving contact with the ball surface and cooperating with the winding heads to present a continuously changing ball surface to the point of winding.

16. In a ball winding machine, the combination of opposed rotary winding heads, rotary ball gripping rollers carried by each of said heads at all time rolling in driving contact with the surface of a ball being wound, and a cam for varying the relation of the axes of rotation of the rollers with respect to the winding heads.

17. In a ball winding machine, the combination of opposed rotary winding heads, sets of ball gripping rollers carried by each of said heads, rotatable supports for said rollers, and cam controlled means for rotating said supports in the same direction and in the opposite direction to the direction of rotation of the winding heads about axes parallel to the axis of rotation of the winding heads.

HIRAM N. HUSE.